United States Patent Office 3,676,180
Patented July 11, 1972

3,676,180
ACID TREATMENT OF ARTIFICIAL LEATHER FOR IMPROVED ADHERENCE WITH A LATEX ADHESIVE
Werner Riess, Erlenbach, and Helmut Schaefer and Bernd Bayer, Elsenfeld, Germany, assignors to Glanzstoff AG, Wuppertal, Germany
No Drawing. Filed Jan. 22, 1969, Ser. No. 793,159
Claims priority, application Germany, Jan. 23, 1968, P 17 19 138.7
Int. Cl. B44d 1/092; D06n 3/00
U.S. Cl. 117—47 A
11 Claims

ABSTRACT OF THE DISCLOSURE

Process for improving the adhesiveness of a microporous artificial leather while retaining its permeability to water vapor, particularly as a pretreatment step in adhering the artificial leather with an aqueous latex adhesive, by treating said leather as a substrate with an aqueous solution of a weakly acidic electrolyte in an amount sufficient to yield a pH-value on the surface of the artificial leather of from about 2 up to less than 7.

---

When natural leather is being made up into shoes or other leather goods, latices are normally used as adhesives. These are usually aqueous dispersions or emulsions of natural rubber, polychloroprene, polyurethane or similar water-emulsifiable elastomeric polymers. Artificial leathers, which consist of impregnated non-woven fibrous webs, to which a porous polymeric layer may also be applied, cannot be bonded with these aqueous latex adhesives. This is because the non-woven fibrous fleece web or porous layer absorbs the adhesive, and the film formation which is necessary for achieving an adhesive bond does not occur.

For this reason it has only been possible to use solutions of polymers in organic solvents as adhesives for such artificial leather, e.g. organic solutions of polyurethane, polychloroprene or natural rubber.

For many reasons, it would be very desirable if the above noted aqueous dispersion of natural or synthetic elastomeric polymers could be used as an adhesive for artificial leather. First of all, these latex adhesives are very easy to handle, since they can be easily sprayed onto the surface of the substrate or applied by using rollers. Polyurethane or polychloroprene adhesives in organic solvents, on the other hand, generally have to be brushed onto a surface. Application of these non-aqueous adhesives by roller is only possible by employing special rollers which are provided with a coating resistant to organic solvents. These latex adhesives dissolved in an organic solvent also have a number of other disadvantages. Thus, relatively large quantities of these liquid organic adhesives are usually required, since their solids or latex content is much lower than in the aqueous latex adhesives. Furthermore, those portions of the artificial leather which have been coated with adhesives based on a liquid organic medium must first be exposed to the air, i.e. most of the organic solvent must first evaporate from the adhesive film being formed before the bond can be made. By comparison, when using aqueous latex adhesives, bonding can be obtained immediately after spraying or coating the leather surface.

Also, the properties of the artificial leather are impaired by the application of adhesives containing organic solvents. It is well known that when manufacturing artificial leather, it is desirable to obtain the highest possible permeability to water vapor. This is particularly important for artificial leather which is to be used as shoe uppers. The vapor permeability is very greatly reduced, e.g., to about 10% of the original value, by any treatment with adhesives which contain organic solvents. In contrast, aqueous latex adhesives tend to affect this vapor permeability only slightly, e.g. as with natural leather, so that a relatively good permeability can be retained.

Another matter which must be considered, when employing adhesives which contain organic solvents, is the difficulty of storage and use of such adhesives in order to avoid any danger of fire or explosion. Also some organic solvents have a certain toxicity. Finally, in factories where articles consisting of both natural and artificial leather are being processed, it is obviously a disadvantage to require the use of entirely different adhesives for the various products.

It is a primary object of the present invention to provide a process or method of treatment of a microporous artificial leather which will permit a substantial improvement in its adhesiveness especially when using a conventional aqueous latex emulsion or dispersion as a film-forming adhesive applied thereto, while also preserving to a substantial extent the permeability to water vapor of the artificial leather product after it has been adhered or bonded. Another object of the invention is to provide a simple pretreatment step for conditioning or modifying the surface of an artificial leather substrate so as to impart an acidic pH-value thereto either in conjunction with the conventional steps employed in the production of the artificial leather or as a subsequent and separate step. Yet another object of the invention is to avoid all of the disadvantages inherent in the use of adhesives based upon an organic solvent while adding very little to the cost of preparing an artificial leather substrate for adhesion or bonding to another surface, including another artificial leather layer. Other objects and advantages of the invention are explained in greater detail hereinafter.

It has now been found, in accordance with the invention, that the adhesive capacity of a microporous artificial leather can be improved and that aqueous dispersions of elastomeric polymers can be used as adhesives for artificial leather, if the artificial leather is first treated with an aqueous solution of a weakly acidic electrolyte so that an acid pH-value is imparted to the artificial leather. More particularly, the invention provides a process for improving the adhesive properties of an artificial leather while retaining good permeability to water vapor by treating the artificial leather with an aqueous electrolytic solution such that the artificial leather acquires a pH-value of from about 2 up to less than 7, preferably about 3 to 6.

The artificial leather is preferably treated with approximately 1 to 10% by weight aqueous solutions of acid-reacting salts which exhibit a pH-value from about 2 up to less than 7, and especially 3 to 6, or with weak, non-volatile organic acids, which exhibit the required pH-value and are also preferably used in 1 to 10% by weight aqueous solutions.

Examples of electrolytes which can be used in aqueous solution to achieve the desired result generally include all acid-reacting salts of inorganic or organic acids, provided that they exhibit the essential pH-values within suitable concentrations. Such salts should ordinarily be used in a concentration in water of not more than 15% by weight and seldom less than 0.5% by weight, the best results being achieved in a range of about 1 to 10% by weight. It will be recognized that acid-reacting salts are those which are normally obtained as the salt of a weak base with a strong acid, e.g. a salt such as ammonium chloride where the cation is derived from the weak base and the anion is derived from a strong acid. The salts of chromium, aluminum, zinc, iron, calcium and ammonium are especially useful provided that the basicity of the cation in comparison to the acidity of the anion permits the pH-value to fall within the required range. The pH-value of such salts at any particular concentration can ordinarily be calculated or readily determined in a routine manner so that there is a very wide selection of available and economical salts. Without being exhaustive, the following acid-reacting salts are quite suitable as the electrolyte:

Ammonium chloride
Zinc chloride
Iron chloride
Calcium chloride
Chromium chloride
Zinc sulphate
Chromium sulphate
Ammonium nitrate
Sodium dihydrogen phosphate In addition, one can use as the electrolyte any non-volatile, weak organic acid which exhibits the desired pH-value within concentrations of about 0.5 to 15% by weight in aqueous solution, preferably about 1 to 10% by weight. Examples of such weak acids include the following:

Citric acid
Tannin

The use of strong mineral acids, such as sulfuric acid, hydrochloric acid or nitric acid, should be avoided. However, the aqueous electrolytic solution is not limited entirely to the specific composition consisting solely of water and the above noted acid-reacting electrolytes but may also include small amounts of neutral-reacting salts such as NaCl or KCl or even other substances provided that they do not have any material effect upon maintaining the essential pH-values prescribed for the invention. Thus, it is also feasible to employ so-called buffer solutions which include a weak acid and also its salt, the concentration of the salt generally being relatively low in comparison to the weak acid.

The reference to "artificial leather" throughout this application is particularly directed to those products which have been developed in recent years as a replacement or substitute for natural leather and which are especially characterized as comprising a highly microporous and vapor permeable but water-impermeable layer or substrate of an elastomeric polymer, preferably of such polymers as polyurethanes and vinyl chloride polymers These layers or sheetlike structures of artificial leather are generally produced in a well-known manner, preferably by first impregnating or coating a non-woven fibrous fleece or web with a solution or gel of the elastomeric ploymer and subsequently washing out the solvent and any non-solvent used to achieve a gel, thereby providing a highly useful impregnated or bonded fibrous layer which in itself constitutes an artificial leather product. In addition, it is also quite desirable to coat the initial polymeric fibrous substrate with a surface layer of the elastomeric polymer, again as a gel which can be washed with water to develop a microporous structure having good vapor permeability. There are of course many variations of these materials and procedures which are well known in the art, including other elastomeric polymers as applied to a non-woven fibrous web or base material or to other types of fabrics or webs which can be otherwise woven, knitted or bonded into a relatively macroporous or open-meshed fibrous textile material before application of the elastomeric polymer.

Such artificial leathers are well-described in such patents as U.S. 3,190,766 as well as in other literature references and do not constitute a distinguishing feature of the present invention. In general, such artificial leathers can be broadly defined as porous sheet-like structures or surface layers consisting essentially of an elastomeric synthetic polymer, particularly those polymers which are known to be preferred as artificial leather materials in the prior art, e.g. polyurethanes polyvinylchloride, copolymers of vinyl chloride with a minor proportion of about 20% or less of other ethylenically unsaturated monomers such as vinyl acetate, vinylidene chloride and the like. Mixtures of such elastomeric polymers are also known to be quite suitable. Also, these polymers may contain other additives such as stabilizers, plasticizers, dyes, pigments, fillers and the like, but the presence of a fibrous filler or reinforcing fibrous fleece or web, especially in non-woven form, is considered to be particularly desirable whether it is used as such or with one or more additional surface coatings of a porous elastomeric polymer.

The treatment with an electrolyte according to the invention can be carried out on the finished artificial leather, but it can also take place in the final stage of the process by which the artificial leather is prepared. Thus, the electrolyte can be added to the last washing water which is used for removing solvent during preparation of the artificial leather. As is known, when manufacturing artificial leather, a preferably non-woven fibrous fleece or web as a sheet-like structure is first impregnated with an elastomeric polymer in an organic solvent, preferably in combination with a non-solvent such as water which is at least partially miscible with the organic solvent so as to form a dispersed polymer gel. The solvent in which the polymer was dissolved or dispersed is then washed out of the impregnated fibrous structure, e.g. in several washing steps with water so as to fully coagulate or solidify the polymer while removing substantially all of the organic solvent. A polyurethane, polyvinylchloride or similar elastomeric surfacing layer may then be applied, from which the solvent is again washed out. In both cases, the elastomeric polymer is formed into a solid microporous structure with the individual pores being interconnected so that the structure is also vapor-permeable.

When manufacturing artificial leather of the chamois leather type, which consists solely of an impregnated non-woven fibrous structure without a surface layer, the treatment with the electrolyte in accordance with the invention can consequently be carried out, for example, by adding an acid salt to the last washing water which is used to remove the solvent from the solution or dispersion of the polymeric impregnating agent. If a smooth surfaced artificial leather is produced, i.e. products which also contain a microporous elastomeric surface layer, the electrolyte is preferably added to the last washing water which is used for washing out the solvent contained in the coagulated mass of the surface layer.

However, the treatment can also be carried out after the artificial leather is fully washed and dried, in which case the electrolyte solutions are preferably applied by spraying or dipping. The pH value of the artificial leather can be easily determined by pressing indicator paper against the moist or remoistened material. The pH value generally corresponds approximately to the pH value of the treatment solution used. Accordingly, the pH-values which are to be imparted to the artificial leather as prescribed herein can be considered equivalent to the pH-values of the aqueous electrolyte treatment solution.

The impregnation or surface treatment with the acidic electrolyte according to the invention does not in any way impair the properties of the artificial leather, and the treated products can be stored for an unlimited period. It is thus a particular advantage of the invention that the treated product can be dried and at any later time be made adherent by coating thereon an aqueous latex dispersion as an adhesive.

The subsequent treatment of artificial leather pretreated according to the invention can be carried out by the methods which are conventional for natural leather. Thus the known latex adhesives, which are based on aqueous dispersions of natural rubber, polychloroprene and the like, may be used as adhesives. The artificial leather is thereby strongly bonded to natural leather or other layers or substrates for which aqueous latex adhesives are especially practical. If one layer or lining of the synthetic or artificial leather is to be adhered to another, a similar pretreatment is recommended for the second layer; i.e. both surfaces to be adhered should be pretreated with the electrolyte.

The process of the invention is further illustrated by the following examples:

EXAMPLE 1

In the preparation of a smooth artificial leather based on a non-woven fibrous web impregnated with a polyurethane and having a similar microporous surface layer, zinc chloride is added to the last wash water during treatment of the surface layer in such a quantity that its concentration in the bath is 10% by weight. The pH-value of the moist artificial leather is approximately 3. The artificial leather is then dried.

For further processing, suitably cuts parts of the leather are sprayed with an aqueous dispersion of polychloroprene as a latex adhesive. The latex coagulates as a film and may be bonded immediately with natural leather or with artificial leather which has been similarly pretreated. The water vapor permeability of the artificial leather, measured according to DIN 53,333 (German Industrial Standard), after being adhered with the aqueous latex, falls from a value of 500 g.%m.$^2$/day to a value of 400 g./m.$^2$/day.

EXAMPLE 2

A chamois-type artificial leather, which consists of a non-woven fibrous web impregnated with a polyurethane and coagulated by washing with water, is adjusted to a pH value below 7 in the same manner as Example 1 by treatment with an aqueous 5% by weight chromium chloride solution (pH=3) as the last washing step. After drying, a latex adhesive based upon natural rubber dispersed in water is applied by means of a roller. The adhesive coagulates as a film and permits the material to be adhered as in Example 1. The vapor permeability of the artificial leather, after the application of the adhesive, decreases only slightly from its original value of 800 g./m.$^2$/day.

EXAMPLE 3

An artificial leather lining material, consisting of a nonwoven fibrous web impregnated and bonded with a dispersion of a synthetic elastomer to provide a dry microporous structure is sprayed with an aqueous solution containing 7% by weight of calcium chloride. A pH-value lower than 7 is found on testing the moist artificial leather sheet. After drying, a polychloroprene latex adhesive as described in Example 1 is sprayed onto the lining material. Again, the decrease in vapor permeability of the lining material after adhering with the adhesive film is well within acceptable limits.

Equally favorable results can be produced when artificial leathers are treated with the following aqueous electrolyte solutions: 10% by weight ammonium chloride solution (pH=6); 5% by weight citric acid solution (pH=2); an aqueous solution which contains 2% by weight of sodium chloride and 3% by weight of ammonium chloride (pH=3); 5% by weight iron chloride solution (pH=2.5). In all cases, the pH value of the treated artificial leather is below 7. The bonding operation with latex adhesives in the form of aqueous dispersions of natural rubber, polychloroprene or polyurethane, does not present any difficulties and still yields high values of vapor permeability.

EXAMPLE 4

An artificial leather the non-woven fibrous web of which is impregnated with a polyester urethane is prepared for the adhesion with a latex adhesive by spraying with a solution of sodium acetate in a concentration of 10% by weight. After drying the increase in weight of the artificial leather is 20 g./m.$^2$.

While processing this pretreated material in the shoe-factory the clicked part of a pattern is sprayed with a polychloroprene-latex for adhering with a genuine leather lining-material. The polychloroprene latex forms by coagulation on the surface of the artificial leather a thin sheet, which is adhering at the leather lining-material similarly treated with latex. The parts adhered are pressed, then it may be processed further immediately, because the latex needs no time for bonding.

EXAMPLE 5

The back of a man-made upper, which consists of a non-woven fibrous web bonded with an elastomeric butadiene acrylonitrile is prepared for adhering with a latex adhesive by spraying with the following mixture:

|  | Percent of wt. |
|---|---|
| Zinc chloride | 5 |
| Sodium chloride | 5 |
| Water | 90 |

The pH-value of the synthetic leather after pretreating and drying is pH 3, 5.

The further processing for shoes is made in the same way as described in Example 4, with the alteration that instead of a genuine lining-leather is needed a man-made lining-material which was pretreated for latex adhesion as described in Example 3.

EXAMPLE 6

A synthetic upper as described in Example 1 is pretreated for latex adhesion with a solution consisting as follows:

|  | Percent of wt. |
|---|---|
| Citric acid | 5 |
| Sodium citrate | 5 |
| Water | 90 |

After drying the weight of the synthetic upper has increased 10 g./m.$^2$.

Processing shoes from this material is made in the same way as described in Example 4.

The invention is hereby claimed as follows:

1. A process for improving the adhesiveness of a microporous artificial leather while retaining its permeability to water vapor, said process comprising treating said artificial leather with an aqueous solution of at least one weakly acidic electrolyte selected from the class consisting of acid-reacting salts and weak, non-volatile organic acids in an amount sufficient to impart to the artificial leather a pH-value of about 2 up to less than 7, and then drying the thus treated artificial leather.

2. A process as claimed in claim 1 wherein the pH-value imparted to said artificial leather is from about 3 to 6.

3. A process a claimed in claim 1 wherein the artificial leather is treated with an approximately 1 to 10% by weight aqueous solution of said at least one electrolyte.

4. A process as claimed in claim 3 wherein said aqueous solution has a pH-value of about 3 to 6.

5. A process as claimed in claim 1 wherein the artificial leather is treated with an aqueous solution of at least one acid-reacting salt containing an ion selected from the group consisting of chromium, aluminum, zinc, iron, calcium and ammonium, said solution having a pH-value of about 2 up to less than 7.

6. A process as claimed in claim 5 wherein said solution has a concentration of said salt of approximately 1 to 10% by weight.

7. A process as claimed in claim 5 wherein said solution has a pH-value of about 3 to 6.

8. A process as claimed in claim 1 wherein said artificial leather which has been treated to impart said pH-value thereto is made adherent by coating thereon an aqueous latex dispersion of an elastomeric polymer.

9. A process as claimed in claim 8 wherein said artificial leather has been treated to impart thereto a pH-value of about 3 to 6.

10. A microporous artificial leather of an elastomeric polymer containing in at least the surface portion thereof at least one acid-reacting electrolyte selected from the class consisting of acid-reacting salts and weak, non-volatile organic acids in an amount sufficient to impart thereto a pH-value of about 2 up to less than 7 when moistened with water.

11. A microporous artificial leather as claimed in claim 10 wherein the amount of said electrolyte is sufficient to impart a pH-value of about 3 to 6.

References Cited

UNITED STATES PATENTS

| | | | |
|---|---|---|---|
| 2,121,717 | 6/1938 | Sullivan | 117—163 |
| 2,161,383 | 6/1939 | Reinhardt et al. | 117—163 |
| 2,173,244 | 9/1939 | Young | 117—163 |
| 2,293,927 | 8/1942 | Beal | 117—163 |
| 3,100,721 | 8/1963 | Holden | 117—135.5 |
| 3,262,808 | 7/1966 | Crooks et al. | 117—47 A |
| 3,314,743 | 4/1967 | Gaguardi | 117—47 A |
| 3,381,614 | 5/1968 | Ratz et al. | 117—47 A |
| 2,606,398 | 8/1952 | Miller | 117—163 |

OTHER REFERENCES

Haines, Tannic Acid Treatment of Polyurethane, IBM Tech Disclosure, vol. 9, No. 7, December 1966.

WILLIAM D. MARTIN, Primary Examiner

R. HUSACK, Assistant Examiner

U.S. Cl. X.R.

117—135.5, 138.8 D, UA, 161 UZ, 163; 156—334, 338; 161—DIG. 2

PO-1050
(5/69)

UNITED STATES PATENT OFFICE
CERTIFICATE OF CORRECTION

Patent No. 3,676,180                    Dated July 11, 1972

Inventor(s) Werner Riess, Helmut Schaefer, and Bernd Bayer

It is certified that error appears in the above-identified patent and that said Letters Patent are hereby corrected as shown below:

Column 1, line 43, "dispersion" should read -- dispersions --.

Column 3, line 51, "ploymer" should read -- polymer --; line 75, "polyurethanes polyvinylchloride" should read
-- polyurethanes, polyvinylchloride --.

Column 4, line 25, "dissloved" should read -- dissolved --.

Column 5, line 18, "cuts" should read -- cut --; line 26, "500 g.%m.2/day" should read -- 500 g./m.2/day --.

Column 8, line 3, "Gaguardi" should read -- Gagliardi --.

Signed and sealed this 12th day of December 1972.

(SEAL)
Attest:

EDWARD M. FLETCHER, JR.                 ROBERT GOTTSCHALK
Attesting Officer                       Commissioner of Patents